(12) United States Patent
Andersson et al.

(10) Patent No.: US 7,712,126 B2
(45) Date of Patent: May 4, 2010

(54) METHOD AND APPARATUS FOR PROVIDING DYNAMIC SECURITY MANAGEMENT

(75) Inventors: Stefan Andersson, Klagerup (SE); Par-Anders Aronsson, Klagshamn (SE)

(73) Assignee: Sony Ericsson Mobile Communications AB, Lund (SE)

( * ) Notice: Subject to any disclaimer, the term of this patent is extended or adjusted under 35 U.S.C. 154(b) by 664 days.

(21) Appl. No.: 10/589,171

(22) PCT Filed: Feb. 8, 2005

(86) PCT No.: PCT/EP2005/050547

§ 371 (c)(1),
(2), (4) Date: Aug. 11, 2006

(87) PCT Pub. No.: WO2005/079037

PCT Pub. Date: Aug. 25, 2005

(65) Prior Publication Data

US 2008/0244685 A1    Oct. 2, 2008

Related U.S. Application Data

(60) Provisional application No. 60/545,833, filed on Feb. 19, 2004.

(30) Foreign Application Priority Data

Feb. 11, 2004    (EP) .................................. 04445010

(51) Int. Cl.
*G06F 17/00* (2006.01)
*G06F 7/04* (2006.01)
*H04L 9/00* (2006.01)

(52) U.S. Cl. ...................... 726/1; 726/2; 726/3; 726/4; 726/5; 726/6; 713/155; 713/156; 713/157; 713/158

(58) Field of Classification Search ...................... 726/1
See application file for complete search history.

(56) References Cited

U.S. PATENT DOCUMENTS 6,760,912 B1 * 7/2004 Yarsa et al. .................. 719/315

FOREIGN PATENT DOCUMENTS

| EP | 1 004 992 | 5/2000 |
| EP | 1 262 859 | 12/2002 |
| EP | 1 361 527 | 11/2003 |
| SE | EP 1-361-527 | * 12/2003 |
| WO | 2002/067173 | 8/2002 |

OTHER PUBLICATIONS

International Preliminary Report on Patentability for PCT/EP2005/050547.

* cited by examiner

*Primary Examiner*—Longbit Chai
(74) *Attorney, Agent, or Firm*—Myers Bigel Sibley & Sajovec

(57) ABSTRACT

Methods and devices provide dynamic security management in an apparatus, such as a mobile telephone terminal. The apparatus includes a platform for running an application; a security manager for handling access of the application to functions existing in the apparatus; an application interface (API) between the platform and the application; a set of access permissions stored in the apparatus and used by the security manager for controlling access of the application to functions through the application interface. Methods can include downloading into the apparatus an object containing access permissions applicable to at least one function; verifying the object; and installing the access permissions together with the existing permissions.

35 Claims, 5 Drawing Sheets

Security policy structure
    Domain (Manufacturer, Operator, Third party, Untrusted): Organisation_A
        Access level (Allowed, Blanket, Session, One shot): Function_A
        Access level (Allowed, Blanket, Session, One shot): Function_B Level OID (0, 1, 2): level value
        Access level (Allowed, Blanket, Session, One shot): Function_B CA (Signature of any certificate): Organisation_D
        Access level (Allowed, Blanket, Session, One shot): Function_A Signature of end entity certificate: Organisation_C
        Access level (Allowed, Blanket, Session, One shot): Function_B

..........................................................................

Policy update
    Domain (Manufacturer, Operator, Third party, Untrusted): Organisation_A
    Signature of end entity certificate: Organisation_C

..........................................................................

Validity: Not before date_A; Not after date_B
    Revocation information

*FIG. 6A*

METHOD AND APPARATUS FOR PROVIDING DYNAMIC SECURITY MANAGEMENT

RELATED APPLICATIONS

The present application is a 35 U.S.C. §371 national phase application of PCT International Application No. PCT/EP2005/05047, having an international filing date of Feb. 8, 2005 and claiming priority to European Patent Application No. 04445010.4, filed Feb. 11, 2004 and United States Provisional Application No. 60/545,833 filed Feb. 19, 2004, the disclosures of which are incorporated herein by reference in their entireties. The above PCT International Application was published in the English language and has International Publication No. WO 2005/079037.

FIELD OF THE INVENTION

The present invention relates to a method for providing dynamic security management in an apparatus, especially a mobile telephone terminal. The invention enables download of applications and shared libraries with associated enhanced security policy. By means of the invention, the security policy is also enhanced by a more detailed structure enabling access of functions at various levels. The invention also relates to an apparatus implementing the method.

STATE OF THE ART

Today mobile telephone terminals include functions implemented in software and hardware that may be accessed by applications implemented in e.g. a Java platform through an application programmer's interface (API). The access is controlled by a security manager using access permissions stored in a security policy. The access permissions are defined for specific domains (also called sand-boxes in a sandbox model). The applications are linked to a specific domain through a root certificate. The applications are integrity protected and their origins are authenticated using digital signatures and certificates pointing to the root certificate.

Thus, functions required for the applications are linked to specific functions existing in the terminal by means of the access permissions as defined by a domain to which the application is linked. However, the security policy is static and it is only possible to download new applications as long as the security policy includes the required access permissions for new functionality associated with the new applications.

It may be desired to download functionality where the security policy in the specific terminal does not include the required access permissions. For instance, the terminal functions may be completed and built into the telephone before the Java platform and security policy is finished. Another problem is that the static security policy does not allow components shared between different applications. The present invention resolves the problem by modifying the security model to enable downloading of applications and shared components, e.g. libraries, together with associated policy information. Even policy information as such may be downloaded.

SUMMARY OF INVENTION

In a first aspect the invention provides a method of providing a dynamic security management in an apparatus comprising: a platform for running an application; a security manager for handling access of the application to functions existing in the apparatus; an application interface (API) between the platform and the application; a set of access permissions stored in the apparatus and used by the security manager for controlling access of the application to functions through the application interface.

According to the invention, the method comprises the steps of: downloading into the apparatus an object containing access permissions applicable to at least one function; verifying the object; installing the access permissions together with the existing permissions.

Suitably, the object is verified by checking a certificate chain of the object and it is verified that a policy of the function allows updates.

In one embodiment, the method comprises downloading a further object containing a library, or the downloaded object further containing a library, said library comprising new routines and/or new functions to be called by an application or library stored in the apparatus; and installing the library to enable access of functions through the application interface (API).

Preferably, the new routines and/or new functions can access existing functions through a library.

The security manger, when accessing functions, may recursively check the permissions of the APIs and libraries in a linked chain related to the called functions In a further embodiment, the method comprises downloading a further object containing an application, or the downloaded object further containing an application, said application containing at least one new function; and installing the new function so that the new function can access existing functions through the application interface.

Preferably, the new functions can access existing functions through a library.

Suitably, the access permissions are contained in a policy file.

Preferably, the policy file has a structure linking access levels of existing functions with a domain associated with the downloaded object.

Preferably, the policy file also has a structure linking access levels of existing functions with information contained in a certificate chain.

The information may include signature of the end entity certificate, signature of an intermediate certificate, or specific level information (level OID).

The policy file may have a structure including logical expressions.

In a second aspect the invention provides a method of providing a dynamic security management in an apparatus comprising: a platform for running an application; a security manager for handling access of the application to functions existing in the apparatus; an application interface between the platform and the application; a set of access permissions stored in the apparatus and used by the security manager for controlling access of the application to functions through the application interface.

According to the invention, the method comprises the steps of: storing the access permissions in a security policy; providing the security policy with a hierarchical structure.

Preferably, the security policy has a structure linking access levels of existing functions with a domain associated with the downloaded object Preferably, the security policy also has a structure linking access levels of existing functions with information contained in a certificate chain.

The information may include signature of the end entity certificate, signature of an intermediate certificate, or specific level information (level OID).

In a third aspect the invention provides an apparatus with dynamic security management comprising: a platform for running an application; a security manager for handling access of the application to functions existing in the apparatus; an application interface between the platform and the application; a set of access permissions stored in the apparatus and used by the security manager for controlling access of the application to functions through the application interface.

According to the invention, the apparatus is arranged: to download an object containing access permissions applicable to at least one function;

to verify the object; and to install the access permissions together with the existing permissions.

Suitably, the security manager is adapted to verify the object by checking a certificate chain of the object, and to verify that a policy of the function allows updates.

In one embodiment, the apparatus is arranged to download a further object containing a library, or the downloaded object further containing a library, said library comprising new routines and/or new functions to be called by an application or library stored in the apparatus; and to install the library to enable access of functions through the application interface.

Preferably, the new routines and/or new functions can access existing functions through a library.

Suitably, the security manger, when accessing functions, is adapted to recursively check the permissions of the application interfaces and libraries in a linked chain related to the called functions.

In a further embodiment, the apparatus is arranged to download a further object containing an application, or the downloaded object further containing an application, said application containing at least one new function; and to install the new function so that the new function can access existing functions through the application interface.

Preferably, the new functions can access existing functions through a library.

Suitably, the access permissions are contained in a policy file.

Preferably, the policy file has a structure linking access levels of existing functions with a domain associated with the downloaded object.

Preferably, the policy file also has a structure linking access levels of existing functions with information contained in a certificate chain.

The information may include signature of the end entity certificate, signature of an intermediate certificate, or specific level information (level OID).

The policy file may have a structure including logical expressions.

In a third aspect the invention provides an apparatus of providing a dynamic security management in an apparatus comprising: a platform for running an application; a security manager for handling access of the application to functions existing in the apparatus; an application interface (API) between the platform and the application; a set of access permissions stored in the apparatus and used by the security manager for controlling access of the application to functions through the application interface (API).

According to the invention, the apparatus is arranged to: store the access permissions in a security policy; provide the security policy with a hierarchical structure.

Preferably, the security policy has a structure linking access levels of existing functions with a domain associated with the downloaded object.

Preferably, the security policy also has a structure linking access levels of existing functions with information contained in a certificate chain.

The information may include signature of the end entity certificate, signature of an intermediate certificate, or specific level information (level OID).

The apparatus may be a portable telephone, a pager, a communicator, a smart phone, or an electronic organizer.

BRIEF DESCRIPTION OF THE DRAWINGS

The invention will be described in detail below with reference to the accompanying drawings in which

FIG. 6A is a schematic drawing illustrating the structure of the security policy;

DETAILED DESCRIPTION OF PREFERRED EMBODIMENTS

The invention is described with reference to downloading of applications in an mobile telecommunication apparatus such as a telephone. The apparatus may be a portable telephone, a pager, a communicator, a smart phone, or an electronic organizer.

Figure 1:
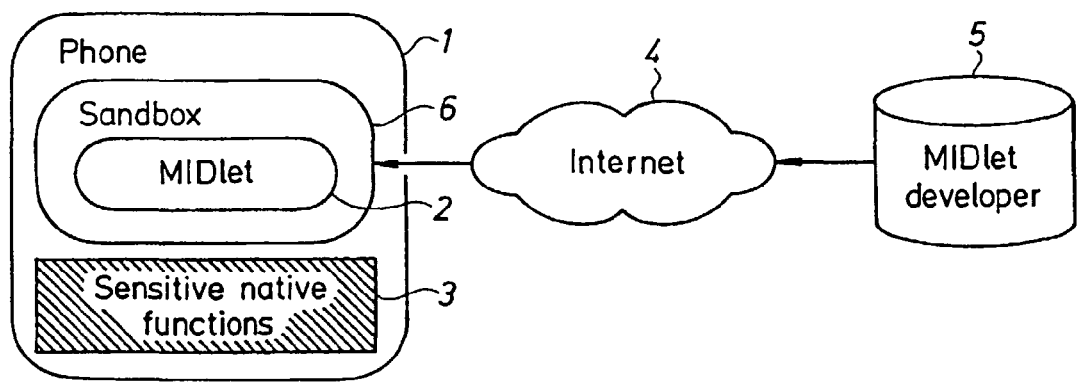
FIG. 1 is a schematic drawing illustrating a security framework based on the sandbox model.

Within the wireless industry MIDP (Mobile Information Device Profile) 2.0 is more or less a de facto standard. The security framework in MIDP 2.0 is based on signed applications and a sandbox model as is illustrated in FIG. 1. In the terminal or phone 1, an application (Midlet) 2 has been downloaded via the Internet 4 from a MIDlet developer 5 and is located within a sandbox 6. In MIDP 2.0 several virtual sandboxes, domains, can be defined. Each domain defines access to a set of native functions 3. Some of these functions may be sensitive and access is therefore protected. These terminal built-in functions are implemented in hardware and software, usually programmed in the language C, but any implementation is possible within this invention, such as Java code. The applications 2, MIDlets, are integrity protected and their origin is authenticated using digital signatures and certificates. In the prior art a MIDlet was assigned to exactly one domain based on the root certificate that was used to verify its certificate chain. In other words, each domain was associated/defined by a set of root certificates.

Figure 2:
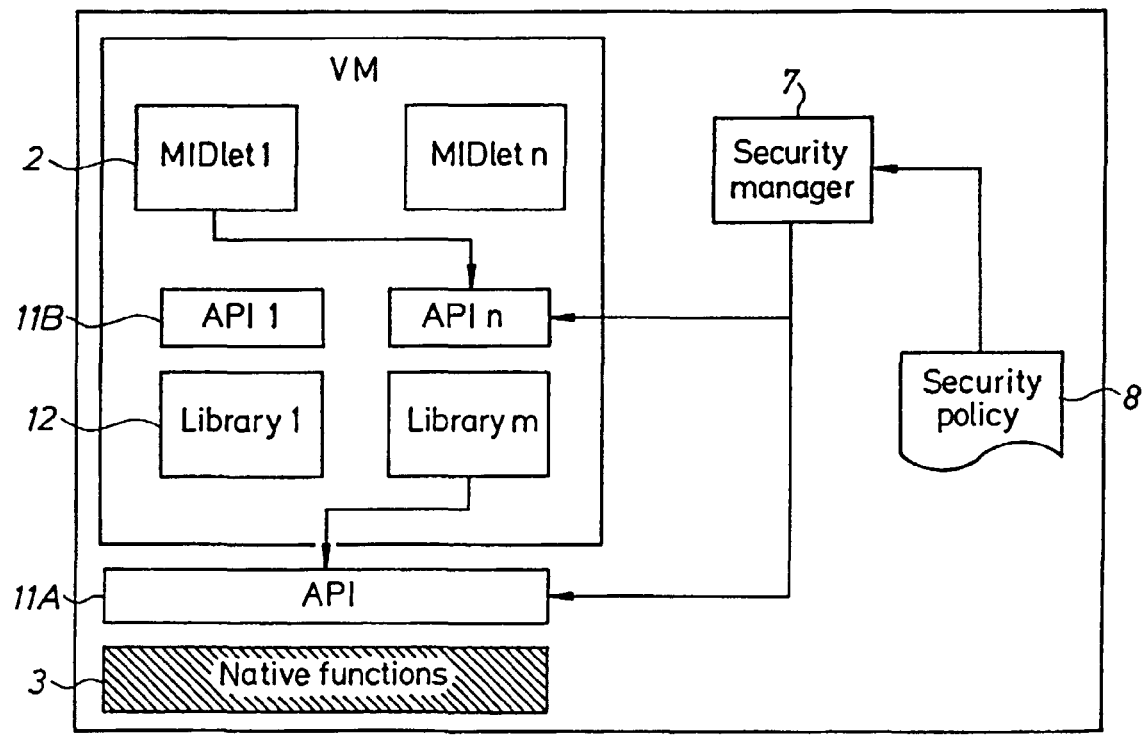
FIG. 2 is a schematic drawing illustrating the operation of the security manager.

The native functions 3 are protected at the edge of the sandbox 6 by a security manager 7 as is shown in FIG. 2. The MIDlets are to be run in a platform or virtual machine. The security manger 7 controls the virtual machine's (VM) access of terminal functions 3 through an API 11 (application programmer's interface). If the platform is implemented in Java, the API is a Java API. The security manger 7 checks the permissions of a MIDlet against a security policy 8 predefined in the phone and controls the API 11 accordingly. In the prior art this security policy was static. In the present invention the API (11A) is enhanced by access permissions and security policy files downloaded together with applications MIDlet 1 to MIDlet n (2) and with Library 1 to Library m (12), in FIG. 2 represented by the boxes API 1 to API n (11B). There can be several layers of libraries. In the present invention, the security manager recursively works down the layers. The security manger 7 first checks the permissions of the first API. If this API is calling further APIs and libraries further permissions belonging to those APIs and libraries are checked.

As mentioned in the introduction it is desired to have the possibility to add further functions to the phone by downloading applications and libraries and shared components.

One example of when libraries are useful is for games. Basically, one would like the game-engine to be a library, which could be used by the levels, where the levels could be downloaded as independent applications. Another possibility would be that all game levels are applications and the common library part is included in the level 1 application.

Another example is access to native functionality. In the prior art it was not possible to add a library that gave the Java environment access through a Java API to for example the calendar data base.

Even if there was communication between MIDlets a static security model would not fit with this more dynamic environment.

A typical object to be downloaded is an application or MiDlet. It contains code for new functionality, usually written in Java, and contains a user interface with which the user can interact with the new functions. It usually also contains the required policy files that are required for accessing the terminal functions used by the new functionality. The object may be downloaded via the Internet by a user or as a step in the manufacturing process by the manufacturer or another entity customizing the mobile terminal before distribution. Some applications may be shared with other applications already stored in the terminal, thus serving as a library. When the application is installed it enhances the existing API with new functionality.

Another object to be downloaded is a library. This is similar to an application but does not include any user interface. Otherwise it contains new functionality shared with other applications in the same way as a MIDlet.

It is also possible to download policy files as such. This is essential when adapting the terminal to functions already downloaded or to be downloaded in the future.

As is known in the art, objects may be integrity protected and their origin may be authenticated using digital signatures and certificates. Each object may contain one certificate or a certificate chain ending with an end entity certificate and finally pointing to a root certificate stored in the terminal, or on a separate module like a SIM-card. Each certificate contains a signature of an organization which can be linked to the domain through the root certificate. Also additional information may be added, each object being identified e.g. with an OID (Object Identifier). The present invention suggests adding a level OID to be used as described below. A downloaded object is contained in two file objects, a Jad (Java Application Descriptor) containing the certificate chain and signatures and a Jar (Java Archive) containing the files proper such as the policy files containing access permissions and class files containing program code.

Figure 3:
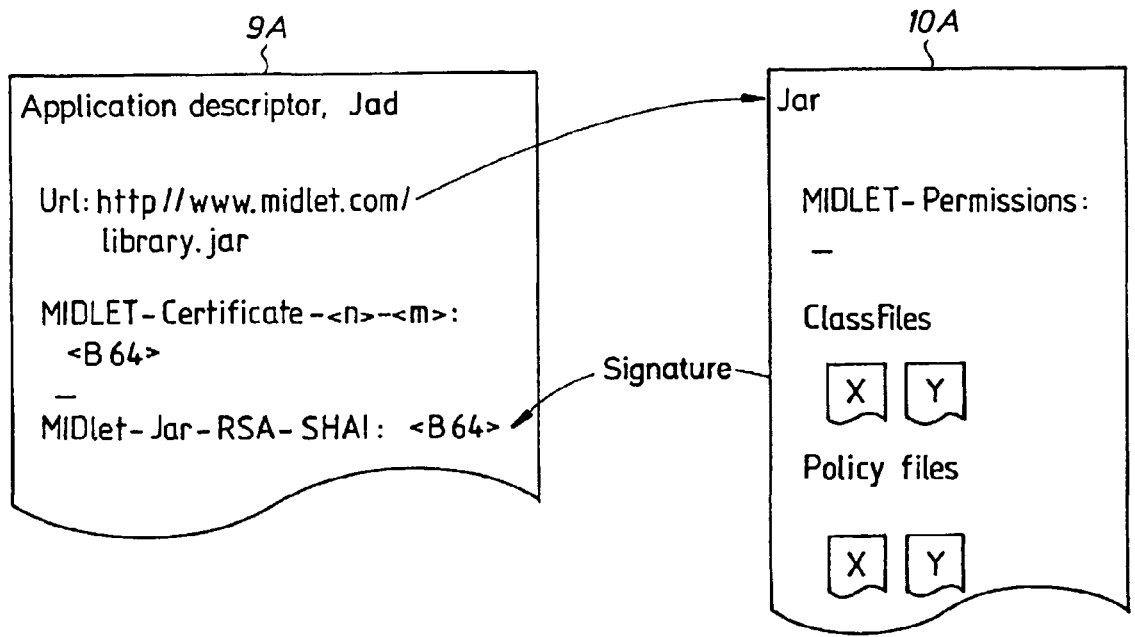
FIG. 3 is a schematic drawing illustrating the process of downloading a library object.
Figure 4:
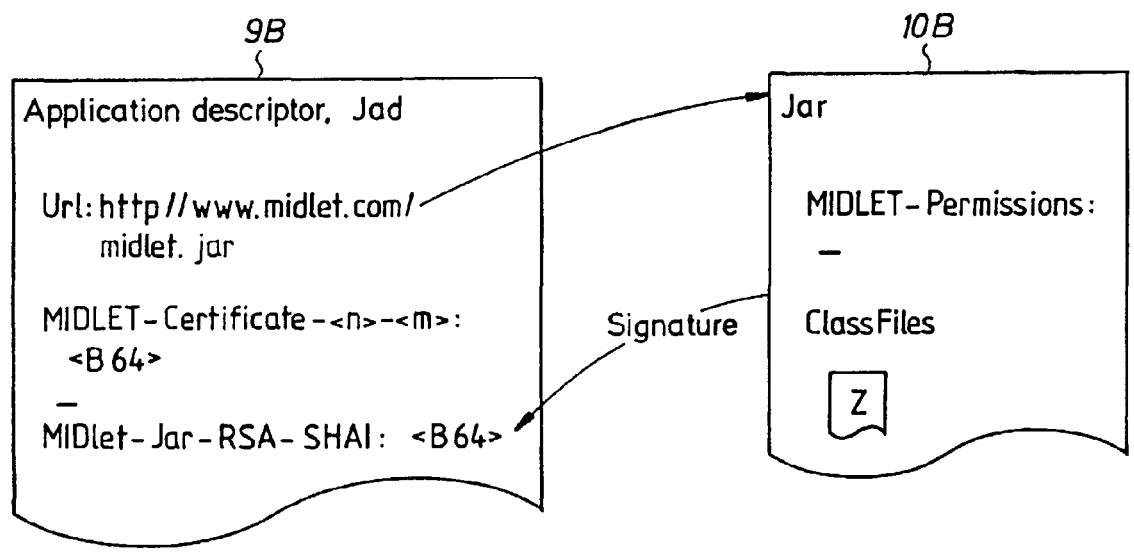
FIG. 4 is a schematic drawing illustrating the process of downloading an application object.

The structure of a library including a Jad file 9A and a Jar file 10A is shown in FIG. 3. The MIDlet permissions contain the domain definition and other permission information to be associated with the policy contained in the downloaded policy files as well as policy files already existing in the terminal. When a library is downloaded and installed the following steps are performed:

1. Verify the certificate chain in the Jad 9A
2. Verify the signature in the Jad 9A against the Jar 10A
3. Give the library permissions to use functions and other libraries based on the root certificate etc. (must include all parameters we define)
4. Read the policy file that should apply for this library and install it together with the library The structure of a MIDlet application including a Jad file 9B and a Jar file 10B is shown in FIG. 4. The MIDlet permissions contain the domain definition and other permission information to be associated with the policy contained in policy files already existing in the terminal. MIDlet applications may also have the same permission file (policy files) included in the Jar-file, i.e. the application can then be used both as an application and a library. The downloaded MIDlet application shown in FIG. 4 without policy files requires that permissions have been stored previously in the terminal, for instance by downloading a policy file as is discussed below with reference to FIG. 5.

When a MIDlet is downloaded and installed the following steps are performed:

1. Verify the certificate chain in the Jad 9B
2. Verify the signature in the Jad 9B against the Jar 10B
3. Give the MIDlet permissions to use functions and libraries based on the root certificate etc. (must include all parameters we define)

Figure 5:
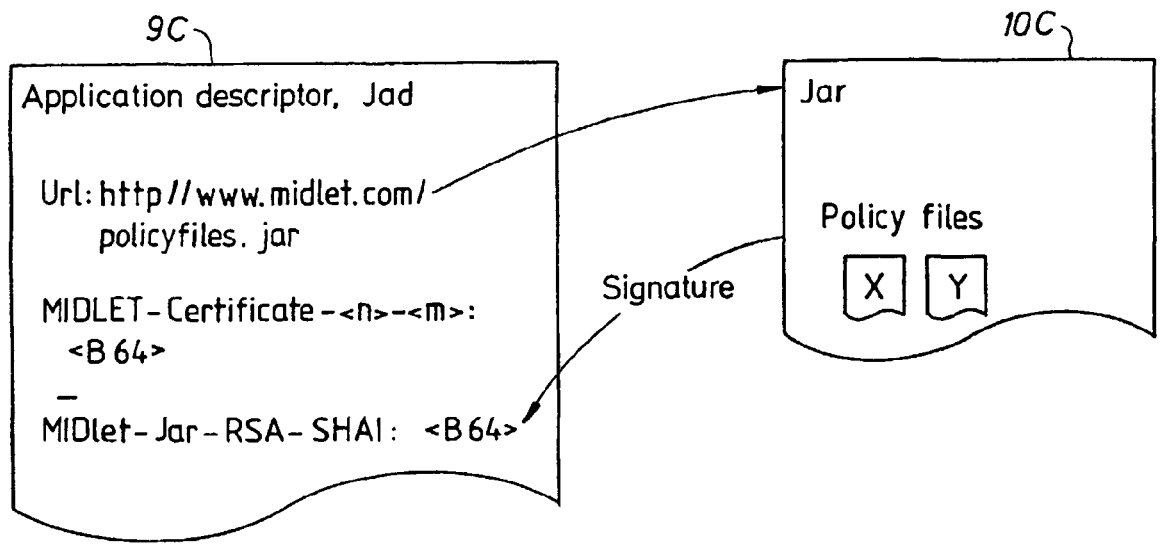
FIG. 5 is a schematic drawing illustrating the process of downloading a policy file object.

The structure of an object only containing policy files is shown in FIG. 5. The object includes a Jad file 9C and a Jar file 10C. When a policy file is downloaded and installed the following steps are performed:

1. Verify the certificate chain in the Jad 9C
2. Verify the signature in the Jad 9C against the Jar 10C
3. Find the libraries or native functions to which this policy shall apply
4. Verify that the policy of the libraries or native functions allows policy updates from the current source The policy for allowing policy updates uses the same syntax as the one describing API access permissions (as is described below with reference to FIG. 6A). Basically the domain, CA, level or end entities can be used to determine if policy updates are allowed from the current source. In order to associate the policy with a library, the policy file must contain the identity of the libraries it is to be associated with.

Several methods can be used to identify a certificate, the subject field, hash of the public key etc. The best method is to use issuer and serial number which is unique for each certificate.

The downloaded objects form the new APIs 1 to n, denoted by 11B in FIG. 2, and the libraries 1 to m, denoted by 12 in FIG. 2. This enhanced application interface gives rise to an "API" with several layers in which functions may be linked through various APIs and libraries. The security manger 7 recursively checks the permissions of the APIs and libraries in a linked chain related to the called functions.

The security policy contains access permissions for various functions, e.g. "Function_A" in FIG. 6A. The access permissions are associated with access levels indicating to which extent the user is involved when accessing a function. There are conventionally four levels: "allowed", that is the user has full access and is never asked; "blanket", that is the user is asked once during a period in which the application is installed; "session", that is the user is asked only once each time the application is executed; and "one shot", that is the user is asked at each access.

The security policy may have a structure as shown in FIG. 6A. As is shown the security policy has a hierarchical structure. In the prior art the access right of function was only linked with a domain as identified by the root certificate. In the present invention the security policy may be enhanced by more detailed information. The domain defines the basic access level which may be combined with other information to define a more fine grained access level possibly resulting in a higher or lower access level of the function than defined by the domain. For instance, a level OID may be defined in the end entity certificate, one certificate may be signed by a certificate authority (CA) and the end entity certificate may be signed by specific organization defining a specific access level.

Figure 6B:
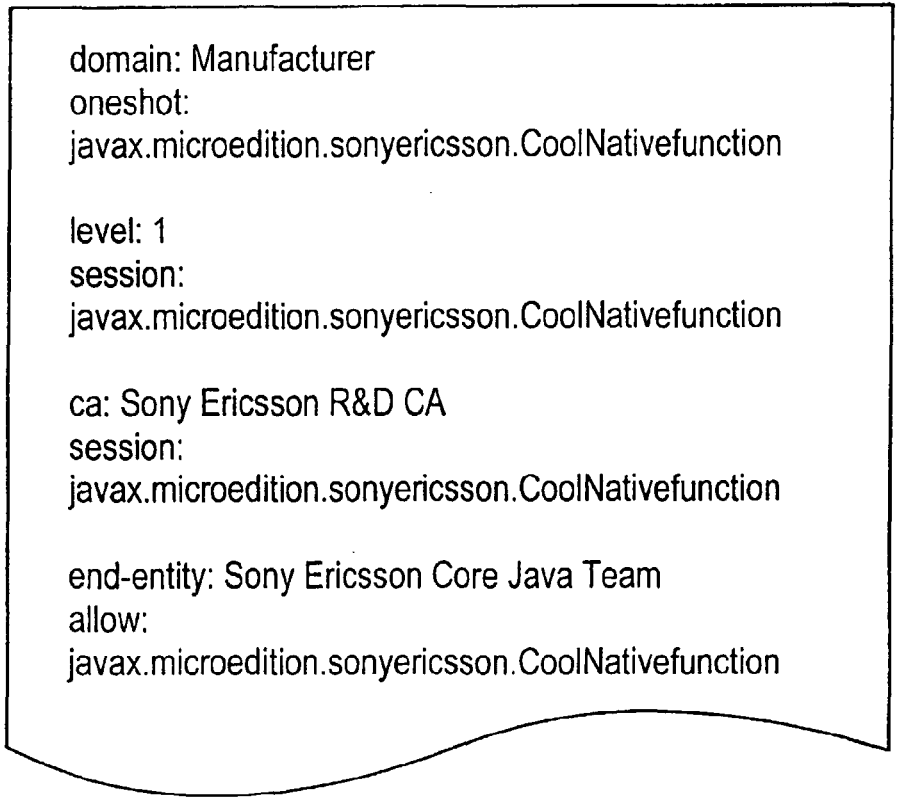
FIG. 6B is a schematic drawing illustrating an example of a security policy.

An example of a security policy of a Function denoted as "javax.microedition.sonyericsson.CoolNativefunction" is shown in FIG. 6B. The subject fields have been assigned specific values, e.g. the subject field of "ca" is Sony Ericsson R&D CA. In plain text, the security policy of FIG. 6B states the following:

All applications in the manufacturer domain will have at least one shot-access to Function.

Applications in the manufacturer domain that have a level 1 indication in the end entity certificate (in other words, an OID value of 1 in the trusted usage attribute field) will have session access to Function.

Applications signed with the certificate issued by Sony Ericsson R&D CA will have at least session access to Function.

Applications in the manufacturer domain signed with a key associated with a Sony Ericsson core Java Team Certificate will have full access (allow) to Function.

The figure is just an illustration of the hierarchical structure and the exact representation of the policy file could be in any format, such as XML, attribute certificates etc. Furthermore, the policy can be expressed using logical expressions, e.g. including AND and OR in the policy file.

An example of a logical expression is e.g. ((InManufacturerDomain AND (EndEntityCertificate.OID("theOID) ="theValue")) OR ((EndEntityCertificate.OID(Organization)="aSpecificCompany") AND (EndEntityCertificate.OID(OrganizationalUnit)="theDepartmentName"))

A possible enhancement to policy file syntax is to allow wildcards when representing the subject field of the certificate, e.g. Sony Ericsson* would apply to our R&D certificate, Core Java Team certificate etc.

The level field in the policy file could be matched against an OID in the trusted usage attribute field of the certificate. The level assigned to the application will be determined by searching the chain for a certificate with a level OID from the end certificate towards the root. The first one found will be used. Consistency is checked from the root towards the end entity certificate.

A policy file can contain several policies. Thus, the access level of a specific function may be defined differently in various domains.

Figure 7:
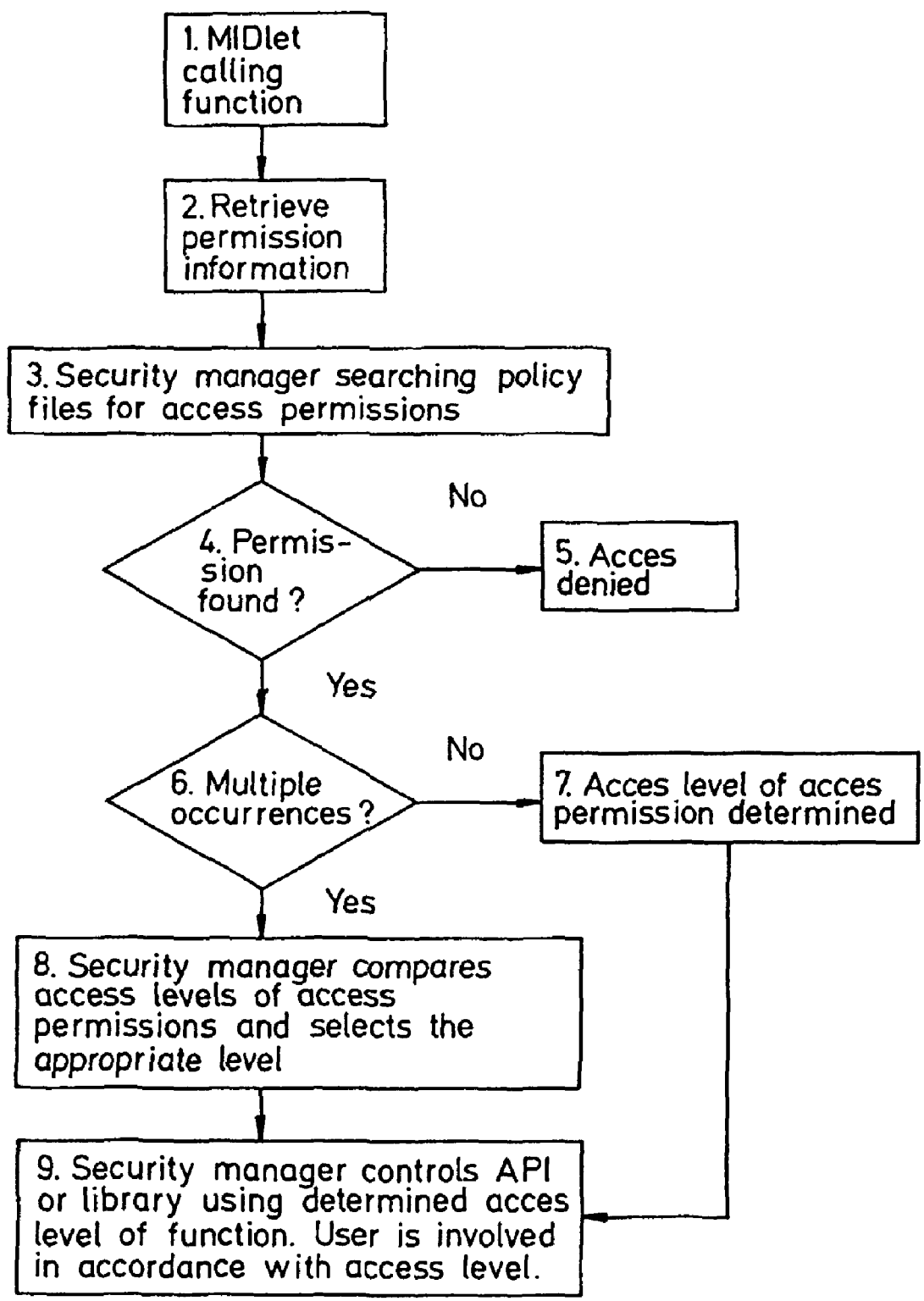
FIG. 7 is a flow chart of an access procedure.

The procedure for accessing a function or library is described below with reference to FIG. 7.

In step 1 a MIDlet is calling a function (a native function or any other function existing in the phone accessible through the API 11 or a library 12 (API 1 to API n), as the case may be).

In step 2 the security manager retrieves permission information of the MIDlet (corresponds to the downloaded MIDlet permissions) by noting the domain of the associated root certificate, noting any level OID-value, CA signatures and end entity signatures etc.

In step 3 the security manager searches the policy files for access permissions. In other words, the security manager pairs retrieved permission information with the access information pertaining to the function of the security policy.

If any access permission of the function is not found in step 4 access is denied in step 5.

If the function is found, the access level of the function permission is determined. This can be either directly (one hit only) or by resolving a logical expression in the security policy, as in step 7 or, alternatively, a security manager compares access levels of various function permissions pertaining to the specific function and selects the appropriate access level in step 8.

Finally, in step 9 the security manager recursively controls the APIs or libraries using the determined access level of the function. Thus, if the wanted function requires access through further APIs or libraries the procedure is repeated. The user is involved in accordance with the determined specific access level.

The signature scheme we are using gives us integrity protection and origin authentication but not replay protection. To achieve replay protection the signature must be calculated over some fresh data. This can be accomplished by including a timestamp in the Jar file. Note that this method applies also to download of applications and libraries.

For security reasons it is useful if the validity of a policy file can be defined. This would limit the lifespan of rouge policy files. Here we introduce some new elements in the policy file syntax as shown by the validity information at the bottom of FIG. 6A.

Policy file validity is one measure against rouge policy files. A better although more costly method is to do the equivalent of revocation checking when the policy file is installed or used. At install time the policy revocation information can be carried in the Jar file. When the policy is used revocation must be checked against information stored in the device or against an on-line server.

Some modifications to our scheme are needed to make it fulfil operator requirements. One requirement is that the policy file should reside on the SIM. The normal case would be to include a URL in the library Jar file pointing at a location on the SIM. One could in addition allow pushed (WAP push, SMS, SAT etc) policy Jad files pointing at a location on the SIM. In an alternative, the same location on the SIM is always used. When performing an update, this position is referenced and just the data is updated, i.e. the policy file. With these methods the operators can remotely modify the policy file on the SIM using conventional methods, such as the SIM tool kit, and then trigger the phone to use it by sending a push message to the phone.

Another requirement is to only enable policies from the operator that has the active SIM in the phone. Similarly to the MIDP 2.0 method for enabling and disabling applications we could store the hash of the operator root from the SIM together with the policy file on the phone. Each time a new SIM is inserted the hash of the root would be calculated and checked against the value stored together with the policy files. If they don't match the policy file is disabled.

Thus, the invention provides several advantages over the prior art. The scope of the invention is only limited by the claims below.

The invention claimed is:

1. A method of providing a dynamic security management in an apparatus, the apparatus comprising: a platform for running an application; a security manager for handling access of the application to functions existing in the apparatus; an application interface between the platform and the application; a set of access permissions stored in the apparatus and used by the security manager for controlling access of the application to functions through the application interface the method comprising:

configuring at least one processor to perform the functions of:

downloading into the apparatus an object containing additional access permissions and other permission information to be associated with security policy contained in the downloaded object as well as access permissions already existing in the apparatus, wherein the permissions are applicable to at least one function, the object comprising new routines and/or new functions;

verifying the object and the associated permissions linked to the existing access permissions;

providing the security with a hierarchical structure including the access permissions in the security policy and the object containing additional access permissions and other permission information; and installing the access permissions together with the existing permissions, the object enhancing the application interface with the new routines and/or new functions.

2. A method according to claim 1, wherein the object is verified by checking a certificate chain of the object.

3. A method according to claim 1-further comprising verifying that a policy of the function allows updates.

4. A method according claim 1, further comprising installing a library comprising new routines and/or new functions to be called by an application or another library stored in the apparatus to enable access of functions through the application interface.

5. A method according to claim 4, wherein the new routines and/or new functions can access existing functions through the library.

6. A method according to claim 5, wherein the security manger, when accessing functions, recursively checks the permissions of the application interfaces and libraries in a linked chain related to the called functions.

7. A method according to claim 1, further comprising installing a new function so that the new function can access existing functions through the application interface.

8. A method according to claim 7, wherein the new functions can access existing functions through a library.

9. A method according claim 1, wherein the access permissions are contained in a policy file.

10. A method according to claim 9. wherein the policy file has a structure linking access levels of existing functions with a domain associated with the downloaded object.

11. A method according to claim 9, wherein the policy file has a structure linking access levels of existing functions with information contained in a certificate chain.

12. A method according to claim 11, wherein the information includes a signature of the end entity certificate, a signature of an intermediate certificate, or specific level information (level OID).

13. A method according to claim 10, wherein the policy file has a structure including logical expressions.

14. A method of providing a dynamic security management in an apparatus, the apparatus comprising: a platform for running an application; a security manager for handling access of the application to functions existing in the apparatus; an application interface between the platform and the application; a set of access permissions stored in the apparatus and used by the security manager for controlling access of the application to functions through the application interface, the method comprising:

configuring at least one processor to perform the functions of:

storing the access permissions in a security policy;

downloading into the apparatus an object containing additional access permissions and other permission information to be associated with security policy contained in the downloaded object as well as the access permissions already existing in the security policy, wherein the permissions are applicable to at least one function and the object includes new routines and/or new functions;

verifying the object and the associated permissions linked to the existing access permissions:

providing the security policy with a hierarchical structure including the access permissions in the security policy and the object containing additional access permissions and other permission information so that the object enhances the application interface with the new routines and/or new functions; and installing the access permissions together with the existing permissions.

15. A method according to claim 14, wherein the security policy has a structure linking access levels of existing functions with a domain associated with the downloaded object.

16. A method according to claim 15, wherein the security policy has a structure linking access levels of existing functions with information contained in a certificate chain.

17. A method according to claim 16, wherein the information includes a signature of the end entity certificate, a signature of an intermediate certificate, or specific level information (level OID).

18. An apparatus with dynamic security management comprising:

a platform for running an application;

a security manager for handling access of the application to functions existing in the apparatus;

an application interface between the platform and the application;

a set of access permissions stored in the apparatus and used by the security manager for controlling access of the application to functions through the application interface wherein the apparatus is configured to download an object containing additional access permissions and other permission information to be associated with security policy contained in the downloaded objects as well as access permissions already existing in the apparatus, wherein the permissions are applicable to at least one function, the object comprising new routines and/or new functions;

to verify the object and the associated permissions linked to the existing access permissions;

to provide the security policy with a hierarchical structure including the access permissions in the security policy and the object containing additional access permissions and other permission information; and to install the access permissions together with the existing permissions, the object enhancing the application interface with the new routines and/or new functions.

19. An apparatus according to claim 18, wherein the security manager is configured to verify the object by checking a certificate chain of the object.

20. An apparatus according to claim 18 wherein the security manager is configured to verify that a policy of the function allows updates.

21. An apparatus according to claim 18, wherein the apparatus is configured to install a library comprising new routines and/or new functions to be called by an application or another library stored in the apparatus to enable access of functions through the application interface.

22. An apparatus according to claim 21, wherein the new routines and/or new functions can access existing functions through the library.

23. An apparatus according to claim 22, wherein the security manger, when accessing functions, is configured to recursively check the permissions of the application interfaces and libraries in a linked chain related to the called functions.

24. An apparatus according claim 18, wherein the apparatus is configured to install a new function so that the new function can access existing functions through the application interface.

25. An apparatus according to claim 24, wherein the new functions can access existing functions through a library.

26. An apparatus according to claim 18, wherein the access permissions are contained in a policy file.

27. An apparatus according to claim 26, Previously Presented wherein the policy file has a structure linking access levels of existing functions with a domain associated with the downloaded object.

28. An apparatus according to claim 26, wherein the policy file has a structure linking access levels of existing functions with information contained in a certificate chain.

29. An apparatus according to claim 28, wherein the information includes a signature of the end entity certificate, a signature of an intermediate certificate, or specific level information (level OID).

30. An apparatus according to claim 28, wherein the policy file has a structure including logical expressions.

31. An apparatus according to claim 18, wherein the apparatus is a portable telephone, a pager, a communicator, a smart phone, or an electronic organiser.

32. An apparatus for providing a dynamic security management comprising:

a platform for running an application;

a security manager for handling access of the application to functions existing in the apparatus;

an application interface between the platform and the application;

a set of access permissions stored in the apparatus and used by the security manager for controlling access of the application to functions through the application interface, wherein the apparatus is configured to download an object containing additional access permissions to be associated with security policy contained in the downloaded objects as well as access permissions already existing in the apparatus, wherein the permissions are applicable to at least one function, said object comprising new routines and/or new functions;

to verify the object and the associated permissions linked to the existing access permissions;

to provide the security policy with a hierarchical structure including the access permissions in the security policy and the object containing additional access permissions and other permission information; and to install the access permissions together with the existing permissions; said object enhancing the application interface with the new routines and/or new functions.

33. An apparatus according to claim 32, wherein the security policy has a structure linking access levels of existing functions with a domain associated with the downloaded object.

34. An apparatus according to claim 33, wherein the security policy has a structure linking access levels of existing functions with information contained in a certificate chain.

35. An apparatus according to claim 34, wherein the information includes a signature of the end entity certificate, a signature of an intermediate certificate, or specific level information (level OID).

* * * * *